Sept. 24, 1935.   A. EDLER ET AL   2,015,551
DISCHARGE DEVICE PROTECTION
Filed June 27, 1934   2 Sheets-Sheet 1

WITNESSES:

INVENTORS
Arnold Edler and
Wilhelm Brockmann
BY
ATTORNEY

Patented Sept. 24, 1935

2,015,551

UNITED STATES PATENT OFFICE 2,015,551

DISCHARGE DEVICE PROTECTION

Arnold Edler, Berlin-Siemensstadt, and Wilhelm Brockmann, Berlin-Charlottenburg, Germany, assignors to Westinghouse Electric & Manufacturing Company, East Pittsburgh, Pa., a corporation of Pennsylvania Application June 27, 1934, Serial No. 732,706
In Germany June 30, 1933

4 Claims. (Cl. 175—363)

Our invention relates to a vapor electric conversion system and particularly to a control system for a vapor electric converter.

It has heretofore been proposed to apply a negative potential to all of the grids of a grid controlled vapor electric device to block the discharge of the valves in the event of a fault in the device. In the heretofore known systems, suitable relays preferably high-speed relays, have been utilized for applying the blocking potential. However, even high-speed relays require a material time interval for the application of a blocking potential. This time interval is frequently sufficient to permit considerable damage to the vapor electric device and its associated apparatus.

It is an object of our invention to provide a system for applying the blocking potential in an extremely short interval after the occurrence of the fault.

It is a further object of our invention to provide a blocking system having no mechanically moving parts.

The control apparatus according to our invention consists of an auxiliary discharge device in series with the heretofore known grid control systems and means responsive to a fault in the rectifier for extinguishing the auxiliary discharge device.

Other objects and advantages will be apparent from the following detailed description, taken in conjunction with the accompanying drawings, in which.

Figure 1:
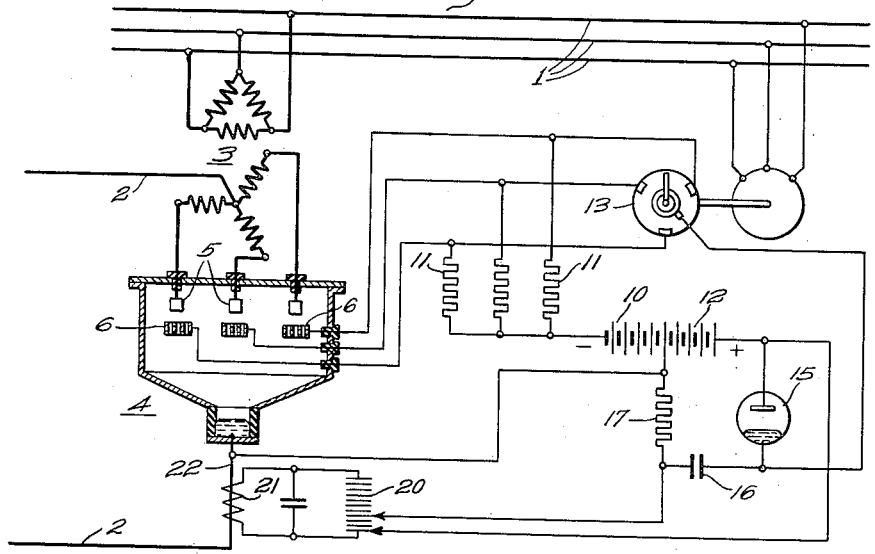
Figure 1 is a schematic illustration of a vapor electric converter embodying my invention.

The apparatus according to our invention comprises an alternating-current circuit 1, a direct-current circuit 2, said alternating and direct-current circuits being connected by means of a suitable transformer 3 and a vapor electric converter 4 for controlling the flow of current between said circuits. Each valve 5 of vapor electric converter 4 is provided with a suitable control electrode 6, preferably in the form of a grid. Each of these grids 6 is connected to a source 10 of blocking potential through a suitable resistor 11. Each of the grids 6 is further connected to a suitable source 12 of positive potential by means of a suitable distributor such as a rotating contactor 13. Connected in series with the positive control potential 12 is a suitable auxiliary discharge device 15. Connected to the auxiliary discharge device 15 is a suitable capacitor 16. One side of this capacitor 16 is connected to the positive terminal of the auxiliary discharge device 15, and the other side is connected to a charging potential through a suitable resistor 17. This control capacitor 16 is connected across the auxiliary discharge device 15 through a suitable control means such as a quenched spark gap 20. The quenched spark gap 20 is in turn connected to a suitable current transformer 21 in one of the load leads, such as the cathode lead 22 of the vapor electric converter 4 to be protected.

In the operation of our improved apparatus the control electrodes 6 are normally maintained at blocking potential by means of the resistors 11 connected to the source 10 of control potential. Positive impulses are periodically applied to these control electrodes 6 to release the same and permit the formation of a current-carrying arc in the valves 5 of the converter. The current flowing in these positive impulses flows through the auxiliary rectifier 15 in series with the distributor 13. When current starts to flow in the auxiliary rectifier 15, the control capacitor 16 is charged through the charging resistance 17 to a potential substantially equal to the potential of the control impulses. Upon the occurrence of a fault in the vapor electric converter 4, the current transformer 21 in the load lead of the converter will apply a high-voltage impulse to the quenched spark gap 20 which will thereupon break down and permit a discharge therethrough. This discharge provides a discharge path for the control capacitor 16 which then discharges in a reverse direction, through the auxiliary discharge tube 15, and quenches the discharge in this auxiliary tube. The quenching of the auxiliary tube 15 instantaneously disconnects the positive impulses and leaves all of the valves 5 of the converter 4 in blocked condition.

Figure 2:
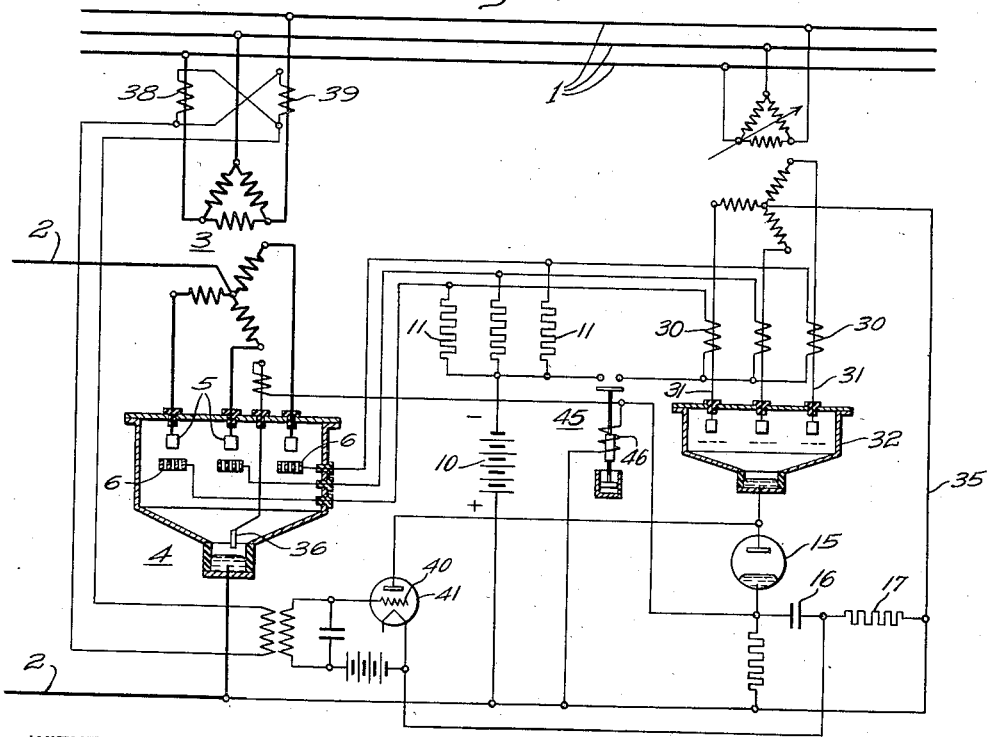
Fig. 2 is a similar view showing a different type of control distributor.

In the modification according to Fig. 2, the positive impulses are applied by means of current transformers 30 in the anode leads 31 of a suitable auxiliary discharge device 32. This auxiliary discharge device 32, in turn, discharges through a suitable discharge device 15 which, in turn, is controlled by a control capacitor 16, the controlling capacitor being charged through a suitable resistor 17 connected to the return lead 35 of the distributing discharge device 32. In order to provide a useful load for the discharge device 32 serving as a distributor, I prefer to supply the keep-alive electrode 36 with current by means of this auxiliary discharge device 32.

Upon the occurrence of a fault in the converter 4 an unbalanced current will be provided by the current transformers 38—39 in the supply leads for the converter 4 which, in turn, releases the grid 40 of a control valve 41 connected to the protective capacitor 16 and discharges the capacitor 16 in a reversed direction across the auxiliary discharge device 15, thereby blocking the distributing valves and also interrupting current flow to the keep-alive electrode 36 of the converter 4.

In order to provide a suitable time interval before the converter 4 can again be placed in operation, I provide a suitable relay 45 between the impulse generators 30 and the cathode circuit and control this relay 45 by a coil 46 in parallel with the keep-alive circuit. Consequently, when the keep-alive circuit is deenergized, the relay 45 opens and disconnects the impulsing device 30 while leaving a suitable negative potential 10 connected to the control electrodes 6. When the device is again put in operation, the impulse generator 30 and the auxiliary discharge device 15 will be activated and pass current to the keep-alive electrode 36 and also pass potential through the control coil 46 of the disconnecting relay 45 for the impulse generator. If desired, the control relay 45 may be a time-controlled relay.

Figure 3:
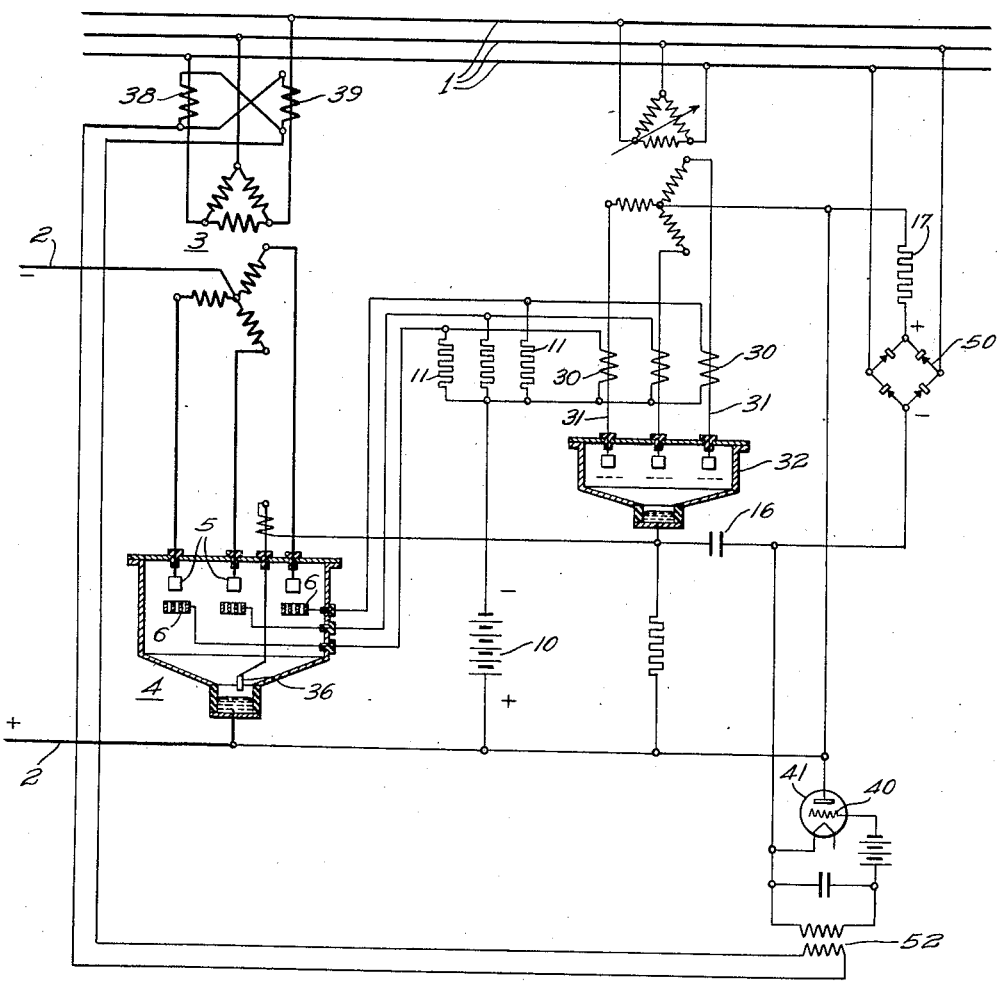
Fig. 3 is a further modification showing further means for applying the blocking potential.

The modification according to Fig. 3 differs from the system of Fig. 2 mainly in that the control capacitor 16 is directly connected across the terminals of the auxiliary valves 32 controlling the impulse generators 30. The control capacitor 16 is now charged from any suitable source, such as an auxiliary rectifier 50, fed from the alternating-current circuit 1.

Upon the occurrence of a fault in the converter 4, the grid 40 of a grid-controlled control valve 41 is supplied with a positive impulse by means of a transformer 52 connected to current transformers 38—39 in the active leads of the converter 4. The capacitor 16 then discharges through the control valve 41 and blocks current flow through the impulse generator 32 and thereby terminates the application of the positive control impulses, leaving the valves 5 of the converter 4 in a blocked condition.

While we have shown and described specific embodiments of our invention, it will be apparent that many changes and modifications can be made therein without departing from the true spirit of our invention or the scope of the accompanying claims.

We claim as our invention:

1. A control system for a vapor-electric converter having a plurality of electric valves, comprising a control grid associated with each of said valves, a source of biasing potential normally maintaining said valves in a blocked condition, means for successively applying control impulses to said grids for releasing the valves, an auxiliary discharge device in series with said means, a capacitor connected to said auxiliary discharge device and means responsive to a fault in said converter for discharging said capacitor for blocking said auxiliary discharge device.

2. A control system for a vapor-electric converter comprising a control electrode for each valve of the converter, a source of control potential for said electrodes, connections for applying blocking potential to said electrodes, an auxiliary vapor-electric device connected to said source of control potential, current transformers associated with each valve of said auxiliary device for applying control impulses respectively to the control electrodes and a discharge device responsive to the condition of the converter for controlling current flow in said auxiliary device.

3. A control system for a vapor electric device comprising control electrodes associated with said device, a source of control potential, means for successively applying said control potential to said electrodes, an arc discharge device in series with said means, a capacitor charged by said arc discharge device and means responsive to an abnormal current condition in the vapor-electric device for discharging said capacitor and blocking current flow through said arc discharge device.

4. A vapor-electric conversion system comprising a multi-valve vapor-electric converter, a starting electrode in said converter, an auxiliary arc discharge device for supplying current to said starting electrode, control electrodes associated with the valves of the converter, transformer means associated with each valve of the auxiliary discharge device for providing respectively a control potential to each control electrode, means for impressing said control potential on the control electrodes, and means responsive to a fault in the converter for blocking said auxiliary discharge device.

ARNOLD EDLER.
WILHELM BROCKMANN.